(12) United States Patent
Lee et al.

(10) Patent No.: US 8,514,953 B2
(45) Date of Patent: Aug. 20, 2013

(54) DELTA WRITING SCHEME FOR MIMO SIGNAL PATHS

(75) Inventors: Hee Choul Lee, San Jose, CA (US); Chan Hong Park, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1114 days.

(21) Appl. No.: 11/935,903

(22) Filed: Nov. 6, 2007

(65) Prior Publication Data

US 2009/0116566 A1    May 7, 2009

(51) Int. Cl.
*H04L 27/28* (2006.01)

(52) U.S. Cl.
USPC .......................................................... 375/260

(58) Field of Classification Search
USPC .................. 375/259, 260, 267, 295, 299, 316, 375/347, 349; 700/53; 455/101, 132–141
See application file for complete search history.

(56) References Cited

U.S. PATENT DOCUMENTS

| 7,373,126 | B2 | 5/2008 | Narita |
| 7,565,117 | B2 * | 7/2009 | Sugar et al. ................... 455/103 |
| 2004/0057539 | A1 * | 3/2004 | Boles et al. ................... 375/354 |
| 2006/0146953 | A1 * | 7/2006 | Raghothaman et al. ....... 375/267 |
| 2007/0098123 | A1 * | 5/2007 | Hara ............................... 375/347 |
| 2007/0281632 | A1 * | 12/2007 | Poon .............................. 455/101 |
| 2008/0123410 | A1 * | 5/2008 | Shirakawa et al. ....... 365/185.03 |

FOREIGN PATENT DOCUMENTS

| CN | 1781266 A | 5/2006 |
| CN | 1877553 A | 12/2006 |
| WO | WO2004095731 A1 | 11/2004 |

OTHER PUBLICATIONS

International Search Report and Written Opinion—PCT/US2008/082492, International Searching Authority—European Patent Office, Mar. 23, 2009.
Taiwan Search Report—TW097142913—TIPO—Dec. 14, 2011.

* cited by examiner

*Primary Examiner* — Khanh C Tran
(74) *Attorney, Agent, or Firm* — Kevin T. Cheatham (57) ABSTRACT

Techniques for writing to registers associated with MIMO signal paths are disclosed. In an embodiment, a controller writes a common value to all registers corresponding to the same operational parameter or parameters, for all signal paths in the MIMO transmitter or receiver. The controller then updates the register in any signal path whose operational paramater differs from the common value, by accumulating a value to the value already in the register, or by replacing the value already in the register with a different value.

28 Claims, 5 Drawing Sheets

SECOND STEP $delt1\_1$ ⟶ TMTR.1_REG.1    IF NECESSARY

⋮

$deltx\_m$ ⟶ TMTR.m_REG.x    IF NECESSARY

SECOND STEP

TMTR.1_REG.1  =+  $delt1\_1$    IF NECESSARY

⋮

TMTR.m_REG.x  =+  $deltm\_x$    IF NECESSARY

DELTA WRITING SCHEME FOR MIMO SIGNAL PATHS

TECHNICAL FIELD

The disclosure relates to communications signal processing, and more particularly, to signal processing techniques for multiple-input multiple-output (MIMO) systems.

BACKGROUND

In a wireless communication system, an RF modulated signal from a transmitter may reach a receiver via a number of propagation paths. The characteristics of the propagation paths typically vary over time due to a number of factors such as fading and multipath. To provide diversity against deleterious path effects and improve performance, multiple transmit and receive antennas may be used. Generally, diversity increases and performance improves with more transmit (TX) and receive (RX) antennas.

A multiple-input multiple-output (MIMO) communication system can employ multiple (M) transmit antennas and multiple (N) receive antennas for data transmission. A MIMO channel formed by the M transmit and N receive antennas may be decomposed into I independent channels, with $I \leq \min\{M, N\}$. Each of the I independent channels corresponds to a dimension, and may also be referred to as a spatial subchannel (or a transmission channel) of the MIMO channel. The MIMO system can provide improved performance (e.g., increased transmission capacity) if the additional dimensionalities created by the multiple transmit and receive antennas are utilized.

Every TX antenna in a MIMO system is usually provided with a corresponding TX signal path, which prepares a signal for transmission over the TX antenna. For example, a TX signal path may include RF circuitry for upconverting and amplifying a baseband TX signal. Similarly, every RX antenna in a MIMO system is usually provided with a corresponding RX signal path, which processes the signal received by the RX antenna. For example, a RX signal path may include RF circuitry for amplifying a received signal, and downconverting the signal to baseband for further RX processing.

For each signal path (TX or RX), multiple parameters may need to be configured depending on the particular characteristics of that signal path. For example, one such parameter may be a common-mode voltage trim parameter associated with a low-noise amplifier (LNA) in each RX signal path. Given that there may be multiple such parameters per signal path, and multiple signal paths in a MIMO system, it would be desirable to have efficient techniques to configure all the parameters of all the signal paths in a MIMO system.

SUMMARY

One aspect of the disclosure provides a method for specifying a parameter for a plurality of signal paths, each signal path corresponding to an antenna for transmission or reception of signals, a set of registers associated with each signal path, the method comprising a first step comprising writing a common value to a register associated with said parameter, the first step further comprising providing said common value to all registers associated with said parameter in said plurality of signal paths; and a second step comprising determining whether, for one of said signal paths, said parameter is associated with a value different from said common value, and if so, modifying the register associated with said parameter in said one of said signal paths.

Another aspect of the disclosure provides a computer program product for specifying a parameter for a plurality of signal paths, each signal path corresponding to an antenna for transmission or reception of signals, a set of registers associated with each signal path, the product comprising computer-readable medium comprising code for causing a computer to write a common value to a register associated with said parameter, the code further causing a computer to provide said common value to all registers associated with said parameter in said plurality of signal paths; and code for causing a computer to determine whether, for one of said signal paths, said parameter is associated with a value different from said common value, and if so, causing the computer to modify the register associated with said parameter in said one of said signal paths.

Yet another aspect of the disclosure provides An apparatus for specifying a parameter for a plurality of signal paths, each signal path corresponding to an antenna for transmission or reception of signals, a set of registers associated with each signal path, the apparatus comprising means for writing a common value to a register associated with said parameter; means for providing said common value to all registers associated with said parameter in said plurality of signal paths; and means for determining whether, for one of said signal paths, said parameter is associated with a value different from said common value, and if so, modifying the register associated with said parameter in said one of said signal paths.

DETAILED DESCRIPTION

Disclosed herein are efficient techniques for specifying the parameters of each signal path in a MIMO receiver or transmitter.

The techniques described herein may be used for various communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. A CDMA system utilizes code division multiplexing (CDM) and transmits modulation symbols in parallel using different channelization codes. A CDMA system may utilize a radio technology such as Wideband-CDMA (W-CDMA), cdma2000, etc. cdma2000 covers IS-2000, IS-856, and IS-95 standards. A TDMA system may utilize a radio technology such as Global System for Mobile Communications (GSM). W-CDMA and GSM are described in documents from the "3rd Generation Partnership Project" (3GPP). cdma2000 is described in documents from the "3rd Generation Partnership Project 2" (3GPP2). 3GPP and 3GPP2 documents are publicly available. An OFDMA system utilizes orthogonal frequency division multiplexing (OFDM) and transmits modulation symbols in the frequency domain on orthogonal subcarriers. An SC-FDMA system utilizes single-carrier frequency division multiplexing (SC-FDM) and transmits modulation symbols in the time domain on orthogonal subcarriers.

The techniques described herein may also be used for MIMO transmitters and receivers for the downlink as well as the uplink. The downlink (or forward link) refers to the communication link from base stations to wireless devices, and the uplink (or reverse link) refers to the communication link from the wireless devices to the base stations.

Figure 1:
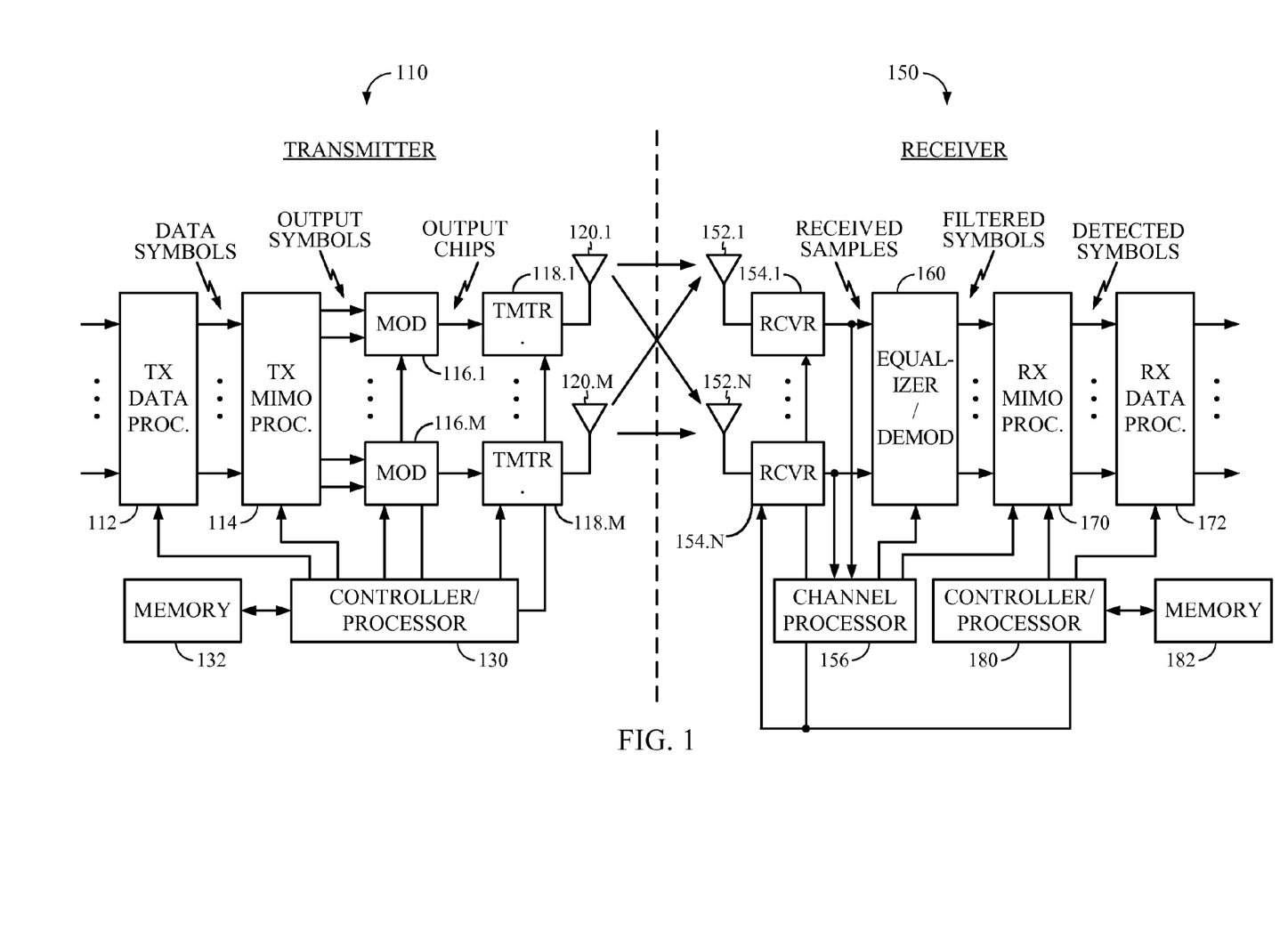
FIG. 1 shows a block diagram of a transmitter 110 and a receiver 150 for a MIMO transmission.

FIG. 1 shows a block diagram of a transmitter 110 and a receiver 150 for a MIMO transmission.

For downlink transmission, transmitter 110 is part of a base station, and receiver 150 is part of a wireless device. For uplink transmission, transmitter 110 is part of a wireless device, and receiver 150 is part of a base station. A base station is typically a fixed station that communicates with the wireless devices and may also be called a Node B, an access point, etc. A wireless device may be stationary or mobile and may also be called a user equipment (UE), a mobile station, a terminal, a station, a subscriber unit, etc. A wireless device may be a cellular phone, a personal digital assistant (PDA), a wireless modem, a laptop computer, a handheld device, etc.

Controllers/processors 130 and 180 direct operation of various processing units at transmitter 110 and receiver 150, respectively. Memories 132 and 182 store data and program codes for transmitter 110 and receiver 150, respectively.

At transmitter 110, a transmit data processor (TX Data Proc) 112 receives traffic data and signaling, processes (e.g., encodes, interleaves, and symbol maps) the data, and provides data symbols. Processor 112 may also generate and multiplex pilot symbols with the data symbols. As used herein, a data symbol is a symbol for traffic data or signaling, a pilot symbol is a symbol for pilot, and a symbol is typically a complex value. The data symbols and pilot symbols may be modulation symbols from a modulation scheme such as PSK or QAM. Pilot is data that is known a priori by both the transmitter and receiver. A TX MIMO processor 114 performs spatial or spatio-temporal processing on the data and pilot symbols and provides output symbols to multiple (M) modulators 116.1 through 116.M. Each modulator 116 modulates its output symbols and provides a modulated output to an associated transmitter unit (TMTR) 118.M modulated signals from M transmitter units 118.1 through 118.M are transmitted from M antennas 120.1 through 120.M, respectively.

Each of transmitter units 118.1 through 118.M may have a plurality of configurable parameters, e.g., parameters for trimming the electrical or other characteristics of the circuitry within each transmitter unit. Such parameters may include, for example, a TX gain control, a driver amplifier bias control, and TX baseband filter controls. These configurable parameters may be programmed by controller/processor 130.

At receiver 150, multiple (N) antennas 152.1 through 152.N receive the transmitted signals via various propagation paths in the wireless environment and provide N received signals to N receiver units (RCVR) 154.1 through 154.N, respectively. Each receiver unit 154 processes (e.g., filters, amplifies, frequency downconverts, and digitizes) its received signal and provides received samples to a channel processor 156 and an equalizer/demodulator 160. Unit 160 provides filtered symbols. A receive (RX) MIMO processor 170 combines the filtered symbols across spatial dimensions and provides detected symbols, which are estimates of the transmitted data symbols. An RX data processor 172 processes (e.g., symbol demaps, deinterleaves, and decodes) the detected symbols and provides decoded data. In general, the processing by equalizer/demodulator 160, RX MIMO processor 170, and RX data processor 172 is complementary to the processing by modulator 116, TX MIMO processor 114, and TX data processor 112, respectively, at transmitter 110.

Each of receiver units 154.1 through 154.N may have a plurality of configurable parameters, e.g., parameters for trimming the electrical or other characteristics of the circuitry within each receiver unit. Such parameters may include, for example, configuration parameters for a low-noise amplifier (LNA) such as a parameter controlling LNA current trimming in high-gain mode, a parameter controlling LNA common-mode voltage trimming, and a parameter controlling LNA gate voltage trimming. These configurable parameters may be programmed by controller/processor 180.

In this specification and in the claims, a "signal path" may encompass circuitry, registers, memory, etc., associated with a signal to be transmitted from a TX antenna, or a signal received from an RX antenna. Accordingly, a signal path may be a transmitter unit, a receiver unit, a modulator, or any sub-component thereof.

Figure 2:
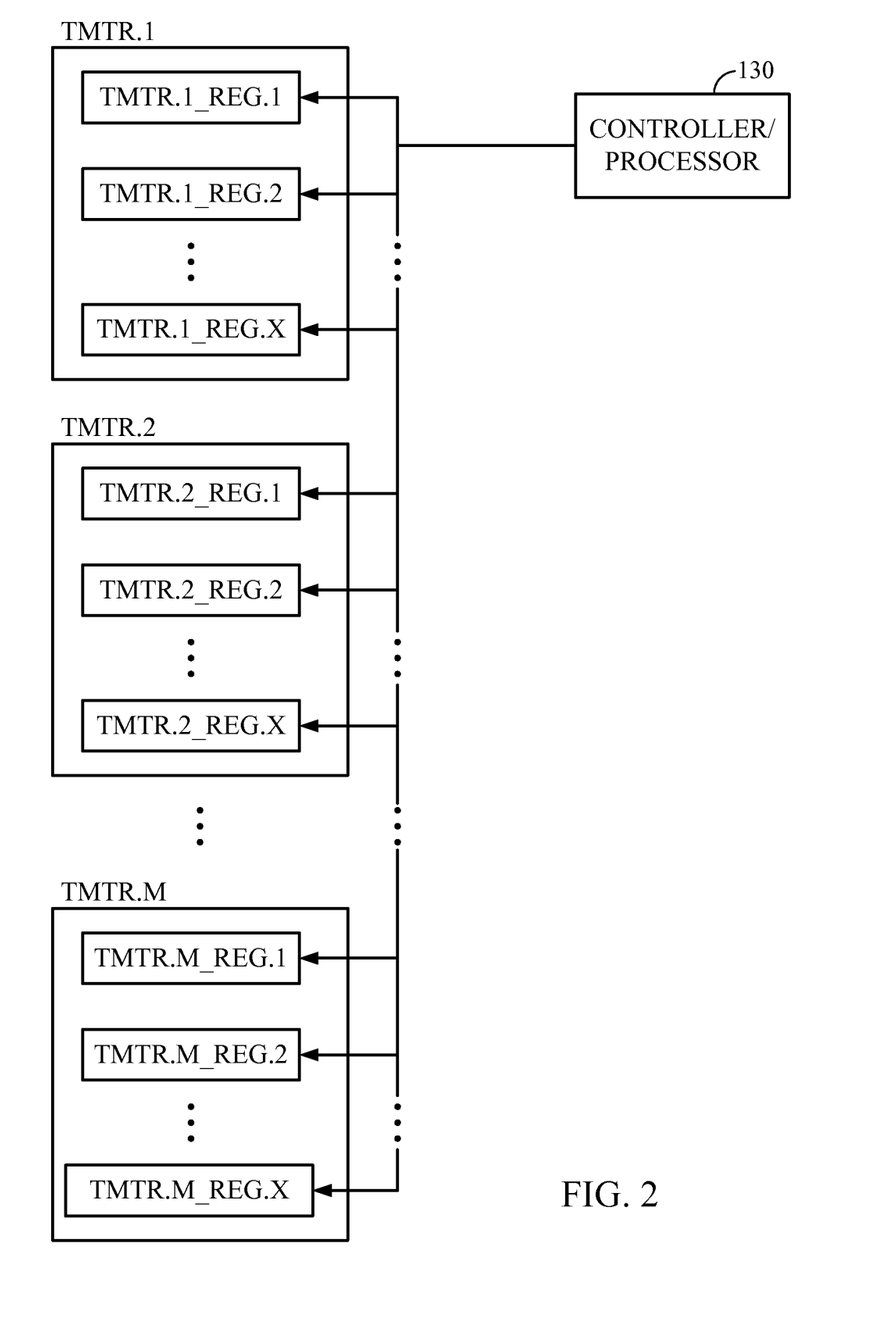
FIG. 2 depicts registers associated with transmitter units 118.1 through 118.M, here labeled TMTR.1 through TMTR.M.

FIG. 2 depicts registers associated with transmitter units 118.1 through 118.M, here labeled TMTR.1 through TMTR.M. Note that while the embodiment of FIG. 2 is described with respect to transmitter units, the techniques disclosed may be readily applied to receiver units. The application of the techniques described herein to receiver units will be clear to those of ordinary skill in the art in light of the present disclosure, and such embodiments are contemplated to be within the scope of the present disclosure.

In FIG. 2, each transmitter unit is associated with a set of registers labeled REG.1, REG.2, ..., REG.X, where X is a variable representing the number of registers per transmitter unit. Each register may contain the value of one or more of the operational parameters for that transmitter unit.

According to the present disclosure, every transmitter unit may be characterized by the same set of operational parameters. Therefore, the same set of registers REG.1, ..., REG.X is provided for each transmitter unit, as shown in FIG. 2. The value of each register may be set by the controller/processor 130.

Figure 3:
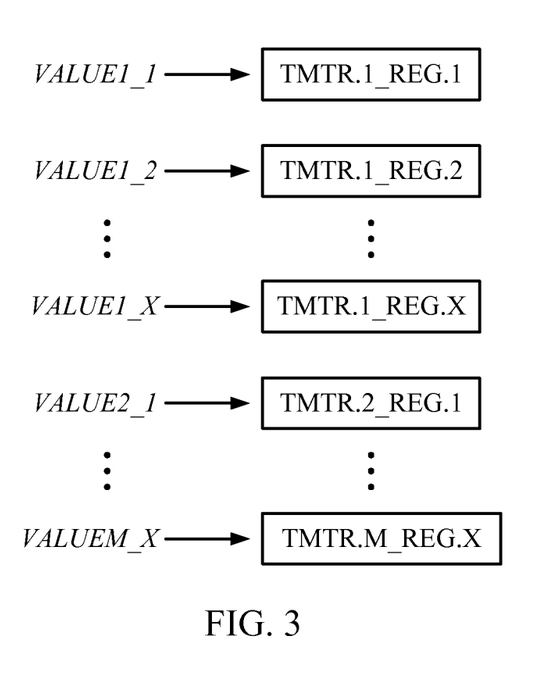
FIG. 3 depicts a prior art technique by which controller/processor 130 configures in sequence the values of the registers shown in FIG. 2.

FIG. 3 depicts a prior art technique by which controller/processor 130 configures in sequence the values of the registers shown in FIG. 2. In FIG. 3, each register of each transmitter unit is separately addressed, and written to with a unique value. For example, a value value1_1 is written to register TMTR.1_REG.1, a value value1_2 is written to register TMTR.1_REG.2, and so on, until all registers in all transmitter units have been addressed and written to. According to this implementation, assuming that writing one value to one register requires one write operation, then the number of write operations required to configure all the registers for all the transmitter units is M times X. Thus the number of required write operations scales linearly with the number of registers per transmitter unit, and the number of transmitter units.

According to the present disclosure, the number of write operations performed by the controller/processor 130 as depicted in FIG. 3 may be reduced by assuming that the same parameter often takes on identical values across transmitter units.

Figure 4A:
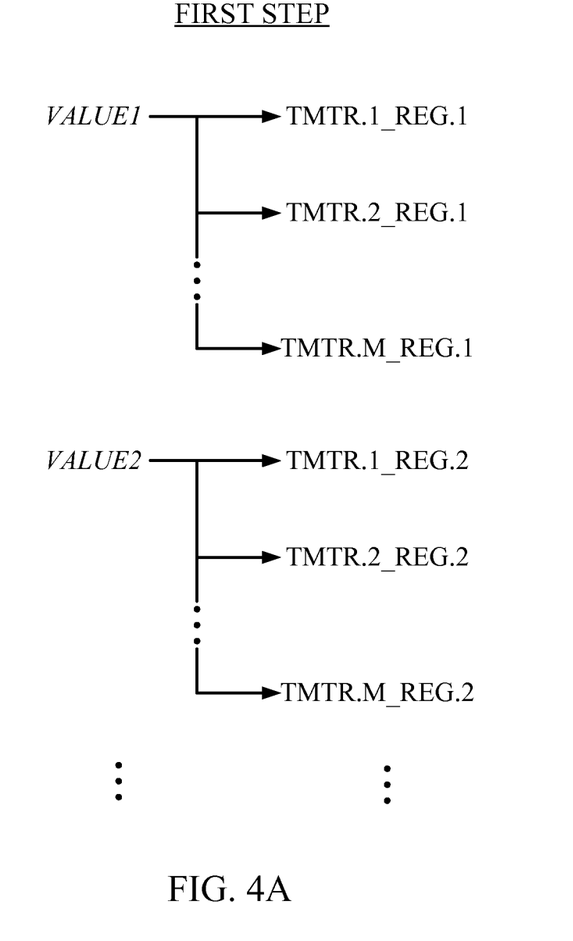
FIGS. 4A and 4B depict a two-step delta writing scheme according to the present disclosure for configuring registers in the transmitter units.
Figure 4B:
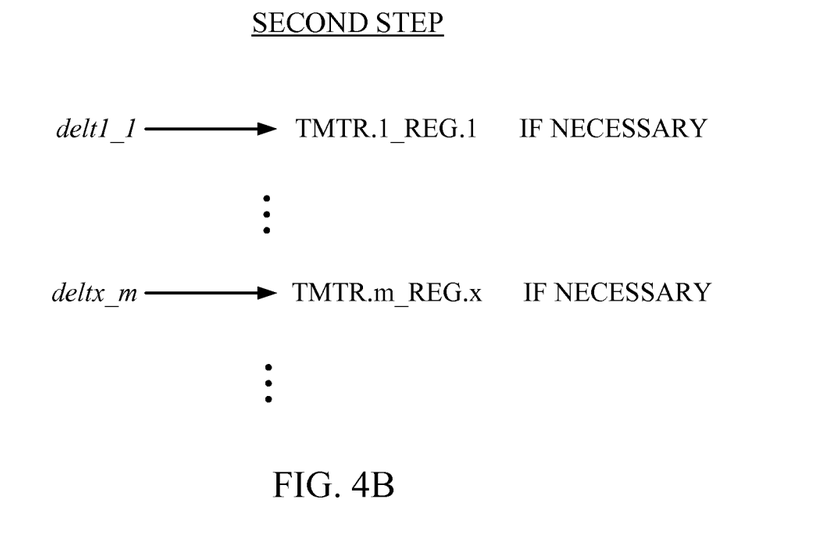

FIGS. 4A and 4B depict a two-step delta writing scheme according to the present disclosure for configuring registers in the transmitter units. Unless otherwise noted, the same techniques may be readily applied to receiver units and their associated registers.

In the first step of the delta writing scheme, depicted in FIG. 4A, a single value value1 is written to REG.1 of all transmitter units, i.e., to TMTR.1_REG.1, TMTR.2_REG.1, ..., TMTR.M_REG.1. Similarly, a single value of value2 is written to REG.2 of all transmitter units, and a single value of value3 is written to REG.3 of all transmitter units, etc., until all registers for all transmitter units have been written to. Assuming that writing a single value to the same register of multiple transmitter units requires only one write operation, then the number of write operations required to configure all the registers for all the transmitter units according to the first step of the delta writing scheme is X. Note that the number of write operations does not scale with the number of transmitter units M.

In an embodiment, one write operation may supply a single value to multiple registers as follows. First, the controller/processor 130 outputs the desired value to a common bus shared among all registers in all transmitter units. Then, at the appropriate time, the bus value is latched to the designated register of all transmitter units. In this way, a single value may be simultaneously written to the registers of all transmitter units.

In an embodiment, controller/processor 130 writes a value to a register in a transmitter unit, during a period when all transmitter units are in a "public write" mode. In the public write mode, a value written to one register in one transmitter unit is automatically copied to the corresponding register in all other transmitter units. Thus, only one write operation is required to specify a value to the same register in all transmitter units in the public write mode.

FIG. 4B depicts a second step of the scheme according to the present disclosure for writing to registers in the transmitter units. The second step modifies, if necessary, the values written to the registers in the first step (depicted in FIG. 4A) of the delta writing scheme.

In FIG. 4B, a value delt1_1 is written to the register TMTR.1_REG.1 only if the register TMTR.1_REG.1 needs to be modified. Thus the value delt1_1 replaces the value written to TMTR.1_REG.1 during the first step shown in FIG. 4A, i.e., "if necessary" as designated in FIG. 4B. According to the present disclosure, the condition "if necessary" may correspond to the case where the actual value for the operational parameter of transmitter unit 1 differs from the value written to the register TMTR.1_REG.1 during the first step shown in FIG. 4A. In this case, if the register TMTR.1_REG.1 does not need to be modified, then no write operation is performed.

Similarly, a value deltm_x may be written to a register TMTR.m_REG.x, but only if such register needs to be modified from the first step. In this way, a write operation is performed only "if necessary," i.e., if the value for an operational parameter of a transmitter unit is different from the common value written to the corresponding register during the first step of the delta writing scheme.

In an embodiment, values in the second step can be written to registers in a "private write" mode, wherein a value written to one register in one transmitter will not be written to the corresponding register in all other transmitters. This contrasts with the "public write" mode described above with reference to FIG. 4A. In this embodiment, the first step depicted in FIG. 4A is performed in public write mode, while the second step depicted in FIG. 4B is performed in the private write mode.

Assuming that, in MIMO systems, the value of a single configurable parameter is often identical across multiple transmitter units, then not all registers will need to be written to during the second step. Accordingly, the number of write operations needed to configure all the registers in all the transmitter units will likely be less than the M times X operations required by the prior art implementation depicted in FIG. 3.

As an example of the possible efficiency gain of the disclosed delta writing scheme, assume that a two-transmit antenna MIMO system includes two transmitter units, each transmitter unit having ten registers for storing the configurable parameters of the transmitter unit. Further assume that the two transmitter units share identical values for nine of the registers. According to the prior art scheme depicted in FIG. 3, the controller/processor 130 would perform twenty write operations to specify all the parameters for all the transmitter units. In contrast, according to the delta writing scheme depicted in FIGS. 4A and 4B, only eleven write operations would be needed to specify all parameters: ten write operations according to the first step, and one write operation according to the second step to specify one value for the register not sharing a common value between the two transmitter units.

Figure 4C:
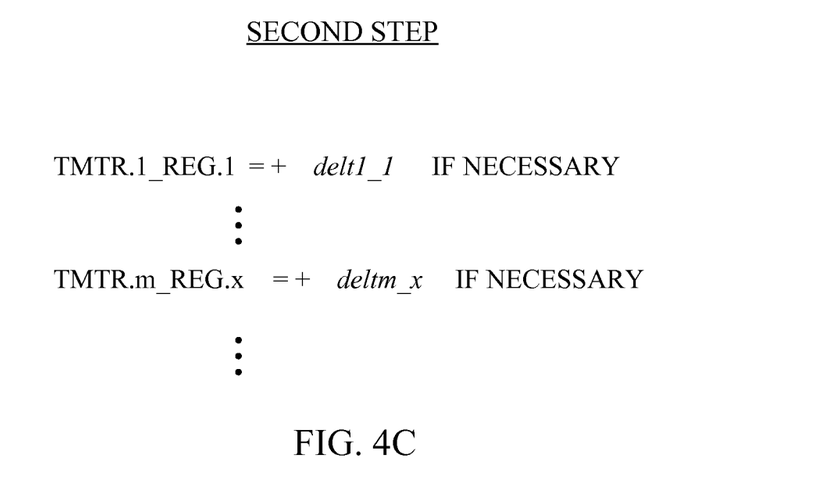
FIG. 4C depicts an embodiment wherein a value already in a register can be accumulated with a given value.

In an embodiment, the second step of the delta writing scheme need not overwrite the value already in a register, as shown in FIG. 4B. Rather, as shown in FIG. 4C, the value already in a register can be accumulated with a value already in the register. This and other modifications to the disclosure will be clear to one of ordinary skill in the art, and are contemplated to be within the scope of the present disclosure.

In an embodiment, the delta writing scheme can be applied to parameters other than those characterizing the electrical circuitry of the TX or RX signal paths. For example, a register specifying power control commands to be sent over the air for a TX signal path may be configured according to the scheme disclosed herein. One of ordinary skill in the art will realize that any parameter associated with transmitter or receiver units may be configured according to the scheme disclosed herein. Embodiments for configuring such other parameters are contemplated to be within the scope of the present disclosure.

While embodiments of the present disclosure have been described with respect to MIMO systems, application to any transmitter or receiver employing multiple antennas and signal paths is contemplated to be within the scope of the present disclosure. For example, the techniques can be applied to configure registers for multiple TX signal paths in a transmitter employing antenna transmit diversity.

Based on the techniques described herein, it should be apparent that an aspect disclosed herein may be implemented independently of any other aspects and that two or more of these aspects may be combined in various ways. Aspects of the techniques described herein may be implemented in hardware, software, firmware, or any combination thereof. If implemented in hardware, the techniques may be realized using digital hardware, analog hardware or a combination thereof. If implemented in software, the techniques may be realized at least in part by a computer program product that includes a computer readable medium on which one or more instructions or code is stored.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), erasable programmable read-only memory (EPROM), FLASH memory, CD-ROM or other optical disk storage, magnetic disk storage or other magnetic storage devices, or any other tangible medium that can be used to carry or store desired program code in the form of instructions or data structures and that can be accessed by a computer.

The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

A number of aspects and examples have been described. However, various modifications to these examples are possible, and the principles presented herein may be applied to other aspects as well. These and other aspects are within the scope of the following claims.

The invention claimed is:

1. A method for specifying a parameter for a plurality of signal paths, each signal path corresponding to an antenna for transmission or reception of signals, a set of registers associated with each signal path, the method comprising:
   using a single write operation to write a common value to two or more registers of separate signal paths of the plurality of signal paths, wherein each of the two or more registers is associated with said parameter; and
   determining whether, for one of said signal paths, said parameter is associated with a value different from said common value, and if so, modifying the register associated with said parameter in said one of said signal paths.

2. The method of claim 1, wherein using the single write operation to write the common value comprises writing the common value to a first register of a first signal path while a first transmit or receive unit associated with the first signal path is in a public write mode, wherein the first transmit or receive unit automatically copies values written to the first register to another register when the first transmit or receive unit is in the public write mode.

3. The method of claim 1, wherein modifying the register comprises writing to the register in a private write mode.

4. The method of claim 1, wherein the plurality of signal paths includes a plurality of transmitter signal paths.

5. The method of claim 1, wherein the plurality of signal paths includes a plurality of receiver signal paths.

6. The method of claim 1, wherein writing the common value comprises:
   outputting the common value onto a bus; and
   latching the common value from said bus into all registers associated with said parameter.

7. The method of claim 1, wherein modifying the register comprises accumulating a value to the value already in the register in said one of said signal paths.

8. The method of claim 1, wherein modifying the register comprises replacing the value already in the register in said one of said signal paths with a different value.

9. A computer program product for specifying a parameter for a plurality of signal paths, each signal path corresponding to an antenna for transmission or reception of signals, a set of registers associated with each signal path, the product comprising:
   a non-transitory computer-readable medium comprising:
      code for causing a computer to use a single write operation to write a common value to two or more registers of separate signal paths of the plurality of signal paths, wherein each of the two or more registers is associated with said parameter; and
      code for causing the computer to determine whether, for one of said signal paths, said parameter is associated with a value different from said common value, and if so, causing the computer to modify the register associated with said parameter in said one of said signal paths.

10. The computer program product of claim 9, wherein using the single write operation to write the common value comprises writing the common value to a first register of a first signal path while a first transmit or receive unit associated with the first signal path is in a public write mode, wherein the first transmit or receive unit automatically copies values written to the first register to another register when the first transmit or receive unit is in the public write mode.

11. The computer program product of claim 9, wherein modifying the register comprises writing to the register in a private write mode.

12. The computer program product of claim 9, wherein the plurality of signal paths includes a plurality of transmitter signal paths.

13. The computer program product of claim 9, wherein the plurality of signal paths includes a plurality of receiver signal paths.

14. The computer program product of claim 9, wherein writing the common value comprises:
   outputting the common value onto a bus; and
   latching the common value from said bus into said registers associated with said parameter.

15. The computer program product of claim 9, wherein modifying the register comprises accumulating a value to the value already in the register in said one of said signal paths.

16. The computer program product of claim 9, wherein modifying the register comprises replacing the value already in the register in said one of said signal paths with a different value.

17. An apparatus for specifying a parameter for a plurality of signal paths, each signal path corresponding to an antenna for transmission or reception of signals, a set of registers associated with each signal path, the apparatus comprising:
   means for writing a common value to two or more registers of separate signal paths of the plurality of signal paths using a single write operation, wherein each of the two or more registers is associated with said parameter; and
   means for determining whether, for one of said signal paths, said parameter is associated with a value different from said common value, and if so, modifying the register associated with said parameter in said one of said signal paths.

18. The apparatus of claim 17, wherein the means for writing a common value comprises means for writing the common value to a first register of a first signal path while a first transmit or receive unit associated with the first signal path is in a public write mode, wherein the first transmit or receive unit automatically copies values written to the first register to another register when the first transmit or receive unit is in the public write mode.

19. The apparatus of claim 17, wherein modifying the register comprises writing to the register in a private write mode.

20. The apparatus of claim 17, wherein the plurality of signal paths includes a plurality of transmitter signal paths.

21. The apparatus of claim 17, wherein the plurality of signal paths includes a plurality of receiver signal paths.

22. The apparatus of claim 17, wherein the means for writing the common value comprises:
  means for outputting the common value onto a bus; and
  means for latching the common value from said bus into all registers associated with said parameter.

23. An apparatus for specifying a parameter for a plurality of signal paths, the apparatus comprising:
  a plurality of antennas for transmitting or receiving signals, wherein each signal path corresponding to each of the plurality of antennas, and wherein a set of registers associated with the each signal path; and
  a processor configured to:
    use a single write operation to write a common value to two or more registers of separate signal paths of the plurality of signal paths, wherein each of the two or more registers is associated with said parameter; and
    determine whether, for one of said signal paths, said parameter is associated with a value different from said common value, and if so, modifying the register associated with said parameter in said one of said signal paths; and
  a memory coupled to the processor.

24. The apparatus of claim 23, wherein using the single write operation to write the common value comprises writing the common value to a first register of a first signal path while a first transmit or receive unit associated with the first signal path is in a public write mode, wherein the first transmit or receive unit automatically copies values written to the first register to another register when the first transmit or receive unit is in the public write mode.

25. The apparatus of claim 23, wherein modifying the register comprises writing to the register in a private write mode.

26. The apparatus of claim 23, wherein the plurality of signal paths includes a plurality of transmitter signal paths.

27. The apparatus of claim 23, wherein the plurality of signal paths includes a plurality of receiver signal paths.

28. The apparatus of claim 23, wherein the processor uses the single write operation to write the common value to all registers associated with said parameter by outputting the common value onto a bus, wherein the common value is latched from said bus into all registers associated with said parameter.

* * * * *